United States Patent
Fukatsu et al.

(10) Patent No.: US 12,168,835 B2
(45) Date of Patent: Dec. 17, 2024

(54) ALUMINUM MEMBER AND METHOD OF MANUFACTURING ALUMINUM MEMBER

(71) Applicant: UACJ CORPORATION, Tokyo (JP)

(72) Inventors: Akihiro Fukatsu, Tokyo (JP); Junji Nunomura, Tokyo (JP)

(73) Assignee: UACJ CORPORATION, Tokyo (JP)

( * ) Notice: Subject to any disclaimer, the term of this patent is extended or adjusted under 35 U.S.C. 154(b) by 491 days.

(21) Appl. No.: 17/332,779

(22) Filed: May 27, 2021

(65) Prior Publication Data

US 2021/0285120 A1    Sep. 16, 2021

Related U.S. Application Data

(63) Continuation of application No. PCT/JP2019/045621, filed on Nov. 21, 2019.

(30) Foreign Application Priority Data

Nov. 30, 2018  (JP) .................................. 2018-225543

(51) Int. Cl.
  *C25D 11/06* (2006.01)
  *B32B 15/01* (2006.01)
  *C25D 11/08* (2006.01)
  *C25D 11/10* (2006.01)
  *C25D 11/14* (2006.01)

(52) U.S. Cl.
  CPC ............. *C25D 11/08* (2013.01); *B32B 15/016* (2013.01); *C25D 11/06* (2013.01); *C25D 11/10* (2013.01); *C25D 11/14* (2013.01)

(58) Field of Classification Search
  CPC ........ B32B 15/04; B32B 15/016; C25D 11/06
  USPC ........................................................ 428/472.2
  See application file for complete search history.

(56) References Cited

U.S. PATENT DOCUMENTS

| | | |
|---|---|---|
| 2012/0288680 A1 | 11/2012 | Nguyen et al. |
| 2013/0324669 A1 | 12/2013 | Nguyen et al. |
| 2014/0044920 A1 | 2/2014 | Nguyen et al. |
| 2014/0193607 A1 | 7/2014 | Browning et al. |
| 2015/0176146 A1 | 6/2015 | Browning et al. |
| 2015/0232716 A9 | 8/2015 | Nguyen et al. |
| 2015/0368823 A1 | 12/2015 | Curran et al. |

(Continued)

FOREIGN PATENT DOCUMENTS

| | | |
|---|---|---|
| CN | 103732527 A | 4/2014 |
| CN | 107815713 A | 3/2018 |

(Continued)

OTHER PUBLICATIONS

Kawamura et al., WO 2020054847 A1 Google Patents Machine translation printed on Nov. 17, 2023, Mar. 19, 2020, entire translation (Year: 2020).*

(Continued)

*Primary Examiner* — Katherine A Christy
(74) *Attorney, Agent, or Firm* — Dorsey & Whitney LLP

(57) ABSTRACT

An example aluminum member consisting of a mother material containing aluminum or an aluminum alloy, and an anodic oxide film on the surface of the mother material, in which the arithmetical mean roughness Ra, the mean length of roughness curve elements RSm, and the Hunter whiteness of the aluminum member, measured from the surface side of the anodic oxide film, are 0.1 µm or more, 10 µm or less, and 60 to 90, respectively.

2 Claims, 2 Drawing Sheets

(56) References Cited

U.S. PATENT DOCUMENTS

| 2016/0185070 A1 | 6/2016 | Nguyen et al. |
| 2017/0121836 A1 | 5/2017 | Tatebe et al. |
| 2017/0121837 A1 | 5/2017 | Tatebe et al. |
| 2017/0121838 A1 | 5/2017 | Tatebe et al. |
| 2019/0106803 A1 | 4/2019 | Browning et al. |
| 2020/0299811 A1 | 9/2020 | Seki et al. |

FOREIGN PATENT DOCUMENTS

| CN | 107916354 A | 4/2018 |
| JP | S53087945 A | 8/1978 |
| JP | S61281897 A | 12/1986 |
| JP | S63145795 A | 6/1988 |
| JP | 2014524843 A | 9/2014 |
| JP | 2017025384 A | 2/2017 |
| JP | 3209960 U | 3/2017 |
| JP | 2017075383 A | 4/2017 |
| JP | 3211272 U | 6/2017 |
| JP | 2018531325 A | 10/2018 |
| WO | 2019044368 A1 | 3/2019 |
| WO | WO-2020054847 A1 * | 3/2020 |

OTHER PUBLICATIONS

English Translation of International Search Report and Written Opinion for PCT Application No. PCT/JP2019/045621, mailed Feb. 18, 2020.

International Preliminary Report on Patentability for PCT Application No. PCT/JP2019/045621, dated May 25, 2021.

PCT Notice of Third Party Observation for PCT Application No. PCT/JP2019/045621, submitted on Oct. 9, 2020.

Sugibayashi, Toshio , "Evaluation of surface properties of shot blasted surface", 2008 General Research & Development Grant, Partial English translation, Partial translation, Oct. 9, 2020, pp. 149-154.

[English Translation] Decision to Grant a Patent mailed on Aug. 5, 2019 for Japanese Patent Application No. 2018-225543.

[English Translation] Notice of Reasons for Refusal mailed on Jun. 24, 2019 for Japanese Patent Application No. 2018-225543.

[English Translation] Request for the Submission of an Opinion dated Jun. 28, 2022 for Korean Patent Application No. 10-2021-7013015.

(Partial English Translation) Written Decision on Registration dated Dec. 27, 2022 in KR application No. 10-2021-7013015; pp. all.

[English Translation] First Notice of Examination Opinion for Chinese Patent Application No. 201980080813.7 dated May 17, 2024, pp. all.

Song, Jin-Long , et al., "Electrochemical machining of super-hydrophobic Al surfaces and effect of processing parameters on wettability", Applied Physics A—Materials Science & Processing, vol. 108, Issue 3, Apr. 25, 2012, pp. 559-568.

Wen, Guangnan , et al., "Study on Opaque White Treatment of Aluminum Surface", Journal of Northeast University (Natural Science Edition) SUM No. 95, vol. 16, No. 2, Apr. 1995.

* cited by examiner

ALUMINUM MEMBER AND METHOD OF MANUFACTURING ALUMINUM MEMBER

CROSS REFERENCE TO RELATED APPLICATIONS

The present application is a continuation application of International Patent Application No. PCT/JP2019/045621 filed on Nov. 21, 2019, which claims the benefit of Japanese Patent Application No. 2018-225543, filed on Nov. 30, 2018. The contents of these applications are incorporated herein by reference in their entirety.

BACKGROUND

Technical Field

The present disclosure relates to an aluminum member and a method of manufacturing the aluminum member, and particularly relates to an aluminum member which is obtained by a simple primary treatment without the need for a complicated step of a secondary or higher treatment, which has high whiteness, and in which unevenness in white color is suppressed, and a method of manufacturing the aluminum member.

Description of the Related Art

An aluminum member having an opaque white color is desired in applications in which weight reduction and designability are required, such as building materials, and housings for electronic devices. However, the opaque white color is a color tone that is difficult to achieve by general dying and coloring methods which are applied in anodic oxidation treatments on aluminum members. Accordingly, production of an aluminum-based material having an opaque white color has been studied.

A method of manufacturing an aluminum member having a white surface by performing a porous type anodic oxidation treatment accompanying current recovery after a barrier type anodic oxidation treatment to change a film structure is disclosed in Japanese Patent Application Laid-Open No. S53-87945. A method of coloring an aluminum member by filling micropores formed by an anodic oxidation treatment with a pigment is disclosed in Japanese Patent Application Laid-Open No. 2017-25384.

However, in the conventional method of manufacturing an aluminum member having a white surface, a complicated electrolysis step, such as a further step of a secondary or higher treatment, is necessary. In addition, expensive facility investment necessary for alternating current electrolysis has to be made. Further, by conventional methods of manufacturing an aluminum member, an aluminum member having sufficient whiteness has not been obtained yet. Furthermore, development of an aluminum member in which unevenness in white color is suppressed as much as possible and appearance characteristics are excellent is desired from the viewpoint of designability.

SUMMARY

The present disclosure is related to providing an aluminum member which is obtained by a simpler primary treatment than in the past, which has high whiteness, and in which unevenness in white color is suppressed, and a method of manufacturing the aluminum member.

An aspect of the present disclosure is an aluminum member including: a mother material containing aluminum or an aluminum alloy; and an anodic oxide film on the surface of the mother material, wherein an arithmetical mean roughness Ra, a mean length of roughness curve elements RSm, and a Hunter whiteness of the aluminum member, measured from the surface side of the anodic oxide film, are 0.1 μm or more, 10 μm or less, and 60 to 90, respectively.

In one embodiment of the present disclosure, a relational expression between the arithmetical mean roughness Ra and the mean length of roughness curve elements RSm satisfies 0.1≤Ra/RSm≤1.2, and the Hunter whiteness of the aluminum member, measured from the surface side of the anodic oxide film, is 70 to 90.

Another aspect of the present disclosure is a method of manufacturing an aluminum member, including: a step of preparing a mother material containing aluminum or an aluminum alloy; and a step of performing an anodic oxidation treatment on the mother material in an electrolytic solution containing: (a) a first acid selected from the group consisting of an inorganic acid and an organic carboxylic acid or a salt of the first acid; and (b) a second acid being an acid anhydride, wherein a concentration of the first acid or a salt of the first acid is 0.01 to 2.0 mol·dm$^{-3}$, and a concentration of the second acid is 0.01 to 5.0 mol·dm$^{-3}$.

In one embodiment of the present disclosure, a current density is 5 to 30 mA·cm$^{-2}$ in the step of performing the anodic oxidation treatment.

In one embodiment of the present disclosure, a temperature of the electrolytic solution is 0 to 80° C. in the step of performing the anodic oxidation treatment.

In one embodiment of the present disclosure, an electrolysis time is 10 to 600 minutes in the step of performing the anodic oxidation treatment.

According to the present disclosure, an aluminum member which is obtained by a simpler primary treatment than in the past, which has high whiteness, and in which unevenness in white color is suppressed, and a method of manufacturing the aluminum member can be provided.

DETAILED DESCRIPTION

Figure 1:
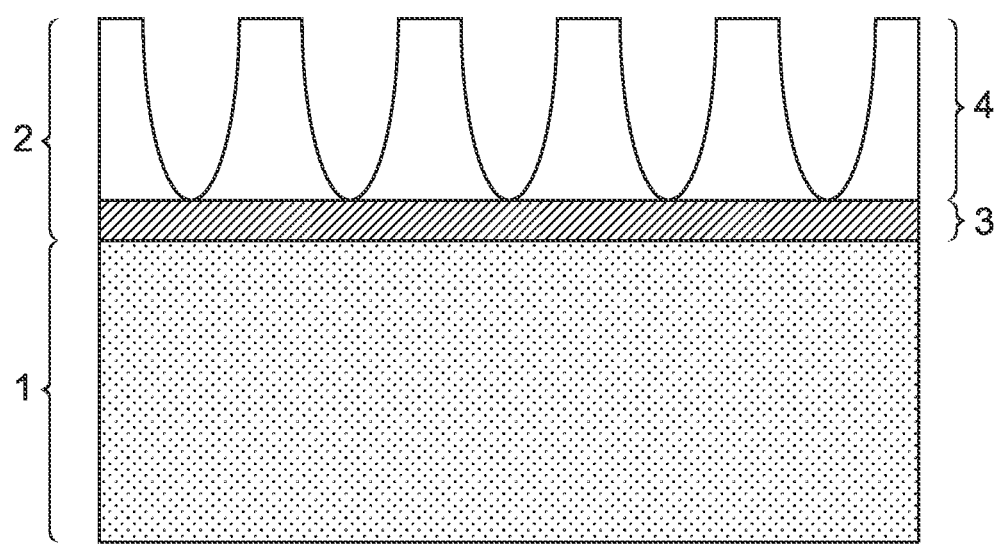
FIG. 1 is an outline diagram schematically showing one embodiment of an aluminum member of the present disclosure.

Hereinafter, embodiments of the present disclosure will be described. Note that the present disclosure is not limited to the following embodiments and can be carried out in various aspects in a range not deviating from the gist of the present disclosure.

<Aluminum Member>

An aluminum member of the present disclosure includes a mother material, and an anodic oxide film on the surface of the mother material. Hereinafter, components of the aluminum member of one embodiment will be described.

(Mother Material)

The mother material contains aluminum or an aluminum alloy, and may be any of aluminum and an aluminum alloy. The material of the mother material can appropriately be selected according to the applications of the aluminum member. For example, it is preferable that the mother material is 5000 series aluminum alloy or 6000 series aluminum alloy from the viewpoint of enhancing the strength of the aluminum member. In addition, it is preferable that the mother material is 1000 series aluminum alloy or 6000 series aluminum alloy in which coloration due to the anodic oxidation treatment is unlikely to occur from the viewpoint of enhancing the whiteness of the aluminum member after the anodic oxidation treatment.

(Anodic Oxide Film)

The anodic oxide film has a barrier layer formed on the surface of the mother material, and a porous layer formed on the barrier layer. It is preferable that the thickness of the anodic oxide film is, but not particularly limited to, 6 to 100 μm, and more preferably 6 to 80 μm as a whole. When the thickness of the anodic oxide film exceeds 100 μm, there is a tendency that the electrolysis time is made long, and therefore lowering of productivity is brought about, and unevenness accompanying nonuniform growth occurs, resulting in a defective appearance.

It is preferable that the thickness of the barrier layer is, but not particularly limited to, 10 to 150 nm from the viewpoint of suppressing coloration due to interference to enhance the whiteness more.

Pores of the porous layer extend from the boundary between the porous layer and the barrier layer to the thickness direction of the porous layer. Here, the pores may extend in such a way as to branch radially toward the surface of the porous layer in the thickness direction of the porous layer. That is, as the pores get close to the surface of the porous layer, one or more pores extend by branching radially in certain angles from one pore, and one or more pores further extend by branching in certain angles from these pores, and in this way, the pores may exist in such a way that one or more pores, which branch from one pore, spread in a certain angle range.

It is preferable that the thickness of the porous layer is, but not particularly limited to, 6 μm or more and less than 100 μm, more preferably 8 to 75 μm, and still more preferably 10 to 50 μm from the viewpoint of suppressing coloration due to interference to enhance the whiteness more. When the thickness of the porous layer is less than 6 μm, the diffusion of light due to irregular reflection is insufficient, and therefore the anodic oxide film is easily made transparent. When the anodic oxide film is transparent, the color tone of the aluminum member as a whole is near the color tone of the mother material, making it difficult to obtain desired whiteness. Note that the upper limit value of the thickness of the porous layer of less than 100 μm is based on the upper limit value of the anodic oxide film of 100 μm.

FIG. 1 is an outline diagram schematically showing one embodiment of the aluminum member of the present disclosure. As shown in FIG. 1, an anodic oxide film 2 is formed on the surface of a mother material 1 containing aluminum or an aluminum alloy. The anodic oxide film 2 has a barrier layer 3 formed on the surface of the mother material 1, and a porous layer 4 formed on the barrier layer 3.

(Arithmetical Mean Roughness Ra)

The aluminum member has an arithmetical mean roughness Ra of 0.1 μm or more. Specifically, the arithmetical mean roughness Ra of the aluminum member, measured from the surface side of the anodic oxide film, is 0.1 μm or more, preferably 0.5 μm or more, and more preferably 1.0 μm or more. The arithmetical mean roughness Ra of a roughness curve is a value obtained by turning the roughness curve in the irregular structure on the surface of the anodic oxide film at the center line and dividing an area obtained from the resultant roughness curve and the center line by unit length, and in other words, represents an extent of the specific surface area. The larger the arithmetical mean roughness Ra of the roughness curve of the aluminum member, the more the area of scattering light increases, so that there is a tendency that an observer can visually recognize the aluminum member as being white. The arithmetical mean roughness Ra can be measured, for example, in accordance with JIS B0601:2001. On the other hand, when the arithmetical mean roughness Ra is less than 0.1 μm, the area of scattering light is small, and therefore the color tone inherent in the aluminum member cannot be reduced. As a result, the light with which the anodic oxide film is irradiated cannot be scattered sufficiently, making it difficult to obtain an aluminum member having high whiteness.

The aluminum member has a mean length of roughness curve elements RSm of 10 μm or less. Specifically, the mean length of roughness curve elements RSm of the aluminum member, measured from the surface side of the anodic oxide film, is 10 μm or less, preferably 8 μm or less, and more preferably 6.0 μm or less. The mean length of roughness curve elements RSm represents a cycle of an irregular structure having a certain elevation difference or more (mean spacing of irregularities). The smaller the mean length of roughness curve elements RSm of the aluminum member is, the more the area of scattering light increases, so that there is a tendency that an observer can visually recognize the aluminum member as being white. The mean length of roughness curve elements RSm can be measured, for example, in accordance with JIS B0601:2001. When the mean length of roughness curve elements RSm of the aluminum member exceeds 10 μm, the area of scattering light is small, and therefore the color tone inherent in the aluminum member is likely to appear. As a result, the light with which the anodic oxide film is irradiated cannot be scattered uniformly, so that unevenness in white color is likely to occur on the aluminum member.

The aluminum member has a Hunter whiteness of 60 to 90. Specifically, the Hunter whiteness of the aluminum member, measured from the surface side of the anodic oxide film, is 60 to 90, preferably 70 to 90, and more preferably 80 to 90. Note that the Hunter whiteness means a numerical value which is obtained in accordance with the standard of JIS P8123, the numerical value measured by the test method for Hunter whiteness. The larger the Hunter whiteness is, the higher whiteness (opaque whiteness) the aluminum member has. When the aluminum member has a high Hunter whiteness of 60 to 90, thereby the aluminum member has a suitable opaque white color, and excellent designability can be imparted to the aluminum member.

It is preferable that a relational expression between the arithmetical mean roughness Ra and the mean length of roughness curve elements RSm satisfies, as the ratio of the arithmetical mean roughness Ra to the mean length of roughness curve elements RSm, $0.1 \leq Ra/RSm \leq 1.2$, more preferably satisfies $0.2 \leq Ra/RSm \leq 1.1$, and still more preferably satisfies $0.3 \leq Ra/RSm \leq 1.0$. Ra/RSm that is a ratio of the arithmetical mean roughness Ra, which represents the roughness in the height direction, to the mean length of roughness curve elements RSm, which represents the roughness in the lateral direction, represents the sharpness of the roughness curve. When the relational expression between the arithmetical mean roughness Ra and the mean length of roughness curve elements RSm satisfies $0.1 \leq Ra/RSm \leq 1.2$, thereby the light with which the anodic oxidation film is irradiated can efficiently be scattered, so that the Hunter whiteness is improved, and therefore there is a tendency that an observer can visually recognize the aluminum member as being whiter.

According to embodiments of the present disclosure, by appropriately controlling the arithmetical mean roughness Ra, which is a roughness parameter in the height direction, and the mean length of roughness curve elements RSm, which is a roughness parameter in the lateral direction, as the surface roughness of an anodic oxide film, the whiteness of the aluminum member is enhanced, and further, the unevenness in white color can be suppressed.

<Method of Manufacturing Aluminum Member>

A method of manufacturing an aluminum member of the present disclosure includes a step of preparing a mother material; and a step of performing an anodic oxidation treatment on the mother material in a particular electrolytic solution. That is, when the predetermined anodic oxidation treatment as a primary treatment is performed, an aluminum member having desired high whiteness can be made without further performing a secondary treatment and a tertiary treatment, such as further use of an electrolytic solution different from the primary treatment, and other complicated treatments subsequent to the anodic oxidation treatment. In this way, an aluminum member having high whiteness can be provided by a simple primary treatment in the method of manufacturing an aluminum member of the present disclosure, and therefore the aluminum member having high whiteness can be produced more efficiently. Hereinafter, each step in the method of manufacturing an aluminum member of one embodiment will be described in detail.

(Step of Preparing Mother Material)

At first, the mother material containing aluminum or an aluminum alloy is prepared. Examples of the aluminum alloy include, but not particularly limited to, 1000 series aluminum alloy, 5000 series aluminum alloy, and 6000 series aluminum alloy as described above.

(Step of Performing Anodic Oxidation Treatment on Mother Material)

The anodic oxidation treatment is performed on the mother material in an electrolytic solution containing: (a) a first acid selected from the group consisting of an inorganic acid and an organic carboxylic acid or a salt of the first acid; and (b) a second acid being an acid anhydride. By the anodic oxidation treatment, the anodic oxide film including a barrier layer having a predetermined thickness on the surface of the mother material; and a porous layer having a predetermined thickness on the barrier layer is formed. It is preferable that the conditions in the anodic oxidation treatment are set to the conditions under which the anodic oxide film as a whole is formed in a thickness of 6 to 100 μm on the surface of the mother material.

The first acid selected from the group consisting of an inorganic acid and an organic acid or a salt of the first acid is mainly used for formation and dissolution of the film on the surface of the mother material, and the second acid being an acid anhydride is mainly used for performing dissolution and reformation on the surface of the anodic oxide film. By using the electrolytic solution containing both of a particular first acid or a salt of the first acid, and a particular second acid in this way in the anodic oxidation treatment, these substances act synergistically, and the aluminum member having excellent designability and having a Hunter whiteness of 60 to 90 can be made by the primary treatment by use of the anodic oxidation treatment.

Examples of the inorganic acid as the first acid or a salt of the inorganic acid include, but not particularly limited to, at least one inorganic acid selected from the group consisting of sulfuric acid, phosphoric acid, chromic acid, and salts of sulfuric acid, phosphoric acid, and chromic acid or a salt of the inorganic salt.

Examples of the organic carboxylic acid being the first acid or a salt of the organic carboxylic acid include oxalic acid, a cyclic oxocarboxylic acid, tartaric acid, maleic acid, and salts of oxalic acid, a cyclic oxocarboxylic acid, tartaric acid, and maleic acid. It is preferable that the cyclic oxocarboxylic acid is, for example, croconic acid, rhodizonic acid, or squaric acid.

Examples of the acid anhydride, being the second acid, as an anhydrous acid not containing a hydrate include, but not particularly limited to, at least one acid anhydride selected from the group consisting of trimellitic anhydride, phthalic anhydride, maleic anhydride, pyromellitic dianhydride, diphosphoric acid, triphosphoric acid, and polyphosphoric acid. Among these acid anhydrides, it is preferable that the acid anhydride is at least one acid anhydride selected from the group consisting of diphosphoric acid, triphosphoric acid, and polyphosphoric acid in terms of being treated stably and easily by a buffer effect.

The concentration of the first acid or a salt of the first acid in the electrolytic solution is 0.01 to 2.0 mol·dm$^{-3}$, and preferably 0.05 to 1.5 mol·dm$^{-3}$. When the concentration of the first acid or a salt of the first acid is less than 0.01 mol·dm$^{-3}$, the anodic oxidation treatment on the mother material cannot be performed uniformly over the whole treatment area, so that the light with which the anodic oxide film is irradiated cannot be scattered uniformly, and therefore a defective appearance (unevenness in white color) is likely to occur. On the other hand, when the concentration of the first acid or a salt of the first acid exceeds 2.0 mol·dm$^{-3}$, the solution viscosity increases and it is difficult to perform the anodic oxidation treatment on the mother material uniformly over the whole treatment area. In addition, the dissolution power of the electrolytic solution is enhanced to make the current density excessive for growing the anodic oxide film, and therefore the mean length of roughness curve elements RSm is made large. Therefore, the light cannot be scattered uniformly, so that a defective appearance (unevenness in white color) is likely to occur.

The concentration of the second acid in the electrolytic solution mainly contributes to the arithmetical mean roughness Ra and is 0.01 to 5.0 mol·dm$^{-3}$, and preferably 0.1 to 2.5 mol·dm$^{-3}$. When the concentration of the second acid is less than 0.01 mol·dm$^{-3}$, the dissolution and the reformation cannot be performed effectively on the surface of the anodic oxide film, so that the irregular structure (a roughness curve of the surface) having a desired arithmetical mean roughness Ra cannot be obtained on the surface of the anodic oxide film. Therefore, the light cannot be scattered sufficiently, making it difficult to obtain high whiteness. On the other hand, when the concentration of the second acid exceeds 5.0 mol·dm$^{-3}$, the solution viscosity increases and it is difficult to perform the anodic oxidation treatment on the mother material uniformly over the whole treatment area, making a defective appearance (unevenness in white color) likely to occur. Therefore, by controlling the concentration of the second acid in a range of 0.01 to 5.0 mol·dm$^{-3}$, the aluminum member having high whiteness and, further, having excellent designability such that the roughness curve on the surface is uniform can be obtained.

The electrolysis time during the anodic oxidation treatment mainly contributes to the arithmetical mean roughness Ra, and it is preferable that the electrolysis time during the anodic oxidation treatment is 10 to 600 minutes, and more preferably 30 to 300 minutes. When the electrolysis time is less than 10 minutes, there is a tendency that the film thickness of the anodic oxide film is thin and an anodic oxide film having a predetermined thickness is not obtained. On the other hand, it is not preferable that the electrolysis time exceeds 600 minutes because the arithmetical mean value Ra hardly changes and the production efficiency is poor.

The current density during the anodic oxidation treatment mainly contributes to the mean length of roughness curve elements RSm, and it is preferable that the current density during the anodic oxidation treatment is 5 to 30 mA·cm$^{-2}$, and more preferably 10 to 30 mA·cm$^{-2}$. When the current density is 5 mA·cm$^{-2}$ or more, thereby the film-forming rate of the anodic oxide film is increased, and the anodic oxidation film having a sufficient thickness can be obtained. When the current density is 30 mA·cm$^{-2}$ or less, thereby the formation and the dissolution of the anodic oxide film on the surface of the mother material can be performed more densely, and it can be suppressed for the mean length of roughness curve elements RSm to be excessively large.

The temperature (liquid temperature) of the electrolytic solution during the anodic oxidation treatment mainly contributes to the mean length of roughness curve elements RSm, and it is preferable that the temperature (liquid temperature) of the electrolytic solution during the anodic oxidation treatment is 0 to 80° C., and more preferably 20 to 80° C. When the temperature of the electrolytic solution is 0° C. or higher, thereby the film-forming rate of the anodic oxidation film is increased, and the anodic oxide film having a sufficient thickness can be obtained. When the temperature of the electrolytic solution is 80° C. or lower, thereby the formation and the dissolution of the anodic oxide film on the surface of the mother material can be performed densely, so that it can be suppressed for the mean length of roughness curve elements RSm to be excessively large.

In this way, by adjusting the conditions in the anodic oxidation treatment, particularly, the concentration of the first acid or a salt of the first acid, and the concentration of the second acid in the electrolytic solution, and, further, the electrolysis time, the current density, and the temperature of the electrolytic solution during the anodic oxidation treatment, the ratio of Ra/RSm, which represents the sharpness of the roughness curve, can be controlled into a desired range.

If necessary, a substrate treatment, such as a degreasing treatment or a polishing treatment, may be performed on the mother material before the anodic oxidation treatment is performed. For example, by performing an alkaline degreasing treatment as the substrate treatment, the gloss value of the anodic oxide film can be lowered and the aluminum member exhibiting a white color without gloss can be obtained. On the other hand, by performing a polishing treatment, such as chemical polishing, mechanical polishing, or electrolytic polishing, as the substrate treatment, the gloss value of the anodic oxidation treatment can be enhanced and an aluminum member having a white color with gloss can be obtained. It is preferable to perform an electrolytic polishing treatment on the mother material before the anodic oxidation treatment is performed from the viewpoint of enhancing the whiteness and the gloss value of the aluminum member more. Note that, if necessary, a post-treatment, such as a sealing treatment, may be performed after the anodic oxidation treatment is performed on the mother material.

According to embodiments of the present disclosure, by performing an anodic oxidation treatment on aluminum members using an electrolytic solution having a particular composition, an aluminum member which is obtained by a simple primary treatment without the need for a complicated step of a secondary or higher treatment, which has high whiteness, and in which unevenness in white color is suppressed, is obtained.

Examples

Hereinafter, the present disclosure will be described in detail based on Examples. Note that the present disclosure is not limited by the Examples shown below, and the formation of the present disclosure can appropriately be modified in a range not impairing the gist of the present disclosure.

Mother materials each containing an aluminum alloy shown in Tables 1 and 2 below were prepared, and anodic oxidation treatments were performed on the mother materials under the conditions shown in Tables 1 and 2, thereby manufacturing aluminum members of Examples 1 to 34 and Comparative Examples 2 to 8. On the other hand, in Comparative Example 1, an anodic oxidation treatment was not performed on the mother material. Note that "1100" described as the type of mother material in Table 1 is 1000 series aluminum alloy, "5052" is 5000 series aluminum alloy, and "6063" is 6000 series aluminum alloy. As a substrate treatment, alkaline degreasing was performed using 5% by mass of NaOH; chemical polishing was performed using a solution obtained by mixing phosphoric acid and sulfuric acid in a volume ratio of 7:3; mechanical polishing was performed using a buff polishing machine; and electrolytic polishing was performed using a solution obtained by mixing glacial acetic acid and perchloric acid in a volume ratio of 4:1.

TABLE 1

| | | | First acid or salt of first acid | | Second acid | | Anodic oxidation treatment | | |
| --- | --- | --- | --- | --- | --- | --- | --- | --- | --- |
| | Type of mother material alloy | Substrate treatment | Material | Concentration (mol · dm$^{-3}$) | Material | Concentration (mol · dm$^{-3}$) | Liquid temperature (° C.) | Current density (mA · cm$^{-2}$) | Electrolysis time (minutes) |
| Example 1 | 1100 | Alkaline degreasing | Sulfuric acid | 0.5 | Diphosphoric acid | 0.2 | 80 | 10 | 10 |
| Example 2 | 1100 | Alkaline degreasing | Sulfuric acid | 0.5 | Diphosphoric acid | 5 | 20 | 10 | 600 |
| Example 3 | 1100 | Alkaline degreasing | Sulfuric acid | 0.01 | Diphosphoric acid | 0.2 | 20 | 10 | 60 |
| Example 4 | 1100 | Alkaline degreasing | Sulfuric acid | 0.05 | Diphosphoric acid | 0.2 | 20 | 10 | 60 |
| Example 5 | 1100 | Alkaline degreasing | Sulfuric acid | 0.5 | Diphosphoric acid | 0.2 | 20 | 10 | 60 |
| Example 6 | 1100 | Alkaline degreasing | Sulfuric acid | 1.5 | Diphosphoric acid | 0.2 | 20 | 10 | 60 |
| Example 7 | 1100 | Alkaline degreasing | Sulfuric acid | 2.0 | Diphosphoric acid | 0.2 | 20 | 10 | 60 |
| Example 8 | 1100 | Alkaline degreasing | Sulfuric acid | 0.5 | Diphosphoric acid | 0.01 | 20 | 10 | 60 |
| Example 9 | 1100 | Alkaline degreasing | Sulfuric acid | 0.5 | Diphosphoric acid | 0.1 | 20 | 10 | 60 |
| Example 10 | 1100 | Alkaline degreasing | Sulfuric acid | 0.5 | Diphosphoric acid | 2.5 | 20 | 10 | 60 |

TABLE 1-continued

| | Type of mother material alloy | Substrate treatment | First acid or salt of first acid | | Second acid | | Anodic oxidation treatment | | |
|---|---|---|---|---|---|---|---|---|---|
| | | | Material | Concentration (mol·dm⁻³) | Material | Concentration (mol·dm⁻³) | Liquid temperature (°C.) | Current density (mA·cm⁻²) | Electrolysis time (minutes) |
| Example 11 | 1100 | Alkaline degreasing | Sulfuric acid | 0.5 | Diphosphoric acid | 5 | 20 | 10 | 60 |
| Example 12 | 1100 | Alkaline degreasing | Sulfuric acid | 0.5 | Diphosphoric acid | 0.2 | 0 | 10 | 60 |
| Example 13 | 1100 | Alkaline degreasing | Sulfuric acid | 0.5 | Diphosphoric acid | 0.2 | 40 | 10 | 60 |
| Example 14 | 1100 | Alkaline degreasing | Sulfuric acid | 0.5 | Diphosphoric acid | 0.2 | 60 | 10 | 60 |
| Example 15 | 1100 | Alkaline degreasing | Sulfuric acid | 0.5 | Diphosphoric acid | 0.2 | 80 | 10 | 60 |
| Example 16 | 1100 | Alkaline degreasing | Sulfuric acid | 0.5 | Diphosphoric acid | 0.2 | 20 | 5 | 60 |
| Example 17 | 1100 | Alkaline degreasing | Sulfuric acid | 0.5 | Diphosphoric acid | 0.2 | 20 | 20 | 60 |
| Example 18 | 1100 | Alkaline degreasing | Sulfuric acid | 0.5 | Diphosphoric acid | 0.2 | 20 | 30 | 60 |
| Example 19 | 1100 | Chemical polishing | Sulfuric acid | 0.5 | Diphosphoric acid | 0.2 | 20 | 10 | 60 |
| Example 20 | 1100 | Mechanical polishing | Sulfuric acid | 0.5 | Diphosphoric acid | 0.2 | 20 | 10 | 60 |
| Example 21 | 1100 | Electrolytic polishing | Sulfuric acid | 0.5 | Diphosphoric acid | 0.2 | 20 | 10 | 60 |
| Example 22 | 5052 | Alkaline degreasing | Sulfuric acid | 0.5 | Diphosphoric acid | 0.2 | 20 | 10 | 60 |
| Example 23 | 6063 | Alkaline degreasing | Sulfuric acid | 0.5 | Diphosphoric acid | 0.2 | 20 | 10 | 60 |
| Example 24 | 1100 | Alkaline degreasing | Sulfuric acid | 1.5 | Diphosphoric acid | 0.2 | 20 | 20 | 10 |
| Example 25 | 1100 | Alkaline degreasing | Sulfuric acid | 0.5 | Diphosphoric acid | 0.2 | 20 | 10 | 30 |
| Example 26 | 1100 | Alkaline degreasing | Sulfuric acid | 0.5 | Diphosphoric acid | 0.2 | 0 | 20 | 300 |
| Example 27 | 1100 | Alkaline degreasing | Phosphoric aci | 0.5 | Diphosphoric acid | 0.2 | 60 | 10 | 60 |
| Example 28 | 1100 | Alkaline degreasing | Phosphate | 0.5 | Diphosphoric acid | 0.2 | 60 | 10 | 60 |
| Example 29 | 1100 | Alkaline degreasing | Oxalic acid | 0.5 | Diphosphoric acid | 0.2 | 60 | 10 | 60 |
| Example 30 | 1100 | Alkaline degreasing | Oxalate | 0.5 | Diphosphoric acid | 0.2 | 60 | 10 | 60 |
| Example 31 | 1100 | Alkaline degreasing | Chromic acid | 0.5 | Diphosphoric acid | 0.2 | 60 | 10 | 60 |
| Example 32 | 1100 | Alkaline degreasing | Chromate | 0.5 | Diphosphoric acid | 0.2 | 60 | 10 | 60 |
| Example 33 | 1100 | Alkaline degreasing | Sulfuric acid | 0.5 | Triphosphoric acid | 0.2 | 60 | 10 | 60 |
| Example 34 | 1100 | Alkaline degreasing | Sulfuric acid | 0.5 | Polyphosphoric acid | 0.2 | 60 | 10 | 60 |

TABLE 2

| | Type of mother material alloy | Substrate treatment | First acid or salt of first acid | | Second acid | | Anodic oxidation treatment | | |
|---|---|---|---|---|---|---|---|---|---|
| | | | Material | Concentration (mol·dm⁻³) | Material | Concentration (mol·dm⁻³) | Liquid temperature (°C.) | Current density (mA·cm⁻²) | Electrolysis time (minutes) |
| Comparative Example 1 | 1100 | Alkaline degreasing | — | — | — | — | — | — | 5 |
| Comparative Example 2 | 1100 | Alkaline degreasing | Sulfuric acid | 0.005 | — | — | 20 | 10 | 60 |
| Comparative Example 3 | 1100 | Alkaline degreasing | Sulfuric acid | 0.5 | Diphosphoric acid | 0.005 | 20 | 10 | 60 |
| Comparative Example 4 | 1100 | Alkaline degreasing | Sulfuric acid | 3.0 | Diphosphoric acid | 0.2 | 20 | 40 | 60 |
| Comparative Example 5 | 1100 | Alkaline degreasing | Sulfuric acid | 3.0 | — | — | 20 | 40 | 60 |
| Comparative Example 6 | 1100 | Alkaline degreasing | Sulfuric acid | 0.5 | — | — | −10 | 5 | 600 |
| Comparative Example 7 | 1100 | Alkaline degreasing | Sulfuric acid | 3.0 | Diphosphoric acid | 1.0 | 20 | 40 | 60 |

Measurement and evaluation described below were performed on the aluminum members of Examples 1 to 34 and Comparative Examples 1 to 8, manufactured in Tables 1 and 2 above. Measurement and evaluation results on these aluminum members are shown in Tables 3 and 4. The Hunter whiteness, the unevenness in white color, and the roughness of the anodic oxide film were measured as follows. With respect to "Determination" in Tables 3 and 4, when the unevenness in white color did not appear, and the Hunter whiteness was 70 or more, the "Determination" was made as "Excellent," when the unevenness in white color did not appear, and the Hunter whiteness was 60 or more and less than 70, the "Determination" was made as "Good," and when the Hunter whiteness was less than 60 and/or the unevenness in white color appeared, the "Determination" was made as "Poor."

<Hunter Whiteness>

L*a*b* specified in JIS Z8781-4:2013 and standardized in the International Commission on Illumination (CIE) were measured for the obtained aluminum members with a colorimeter, and evaluated by converting the L*a*b* to Hunter whiteness by use of the following equation.

Hunter whiteness=$100-\{(100-L^*)^2+a^{*2}+b^{*2}\}^{1/2}$

<Unevenness in White Color>

The appearances of the samples of the Examples and the Comparative Examples after the anodic oxidation treatments were observed visually. From the observation of the appearance of a sample of 10 cm², when the sample was anodically oxidized in a uniform manner, the sample was evaluated as "good," and when unevenness in white color occurred or the sample was not anodically oxidized, the sample was evaluated as "poor".

<Roughness of Anodic Oxide Film>

The surface roughness of the anodic oxide film was measured for the samples of the Examples and the Comparative Examples after the anodic oxidation treatments using a laser microscope ("LEXT-OLS3000," manufactured by Olympus Corporation). On that occasion, line analysis horizontal to the rolling direction and line analysis parallel to the rolling direction each were performed on three lines for a visual field of 128 μm×96 μm in an arbitrary spot on the surface of the anodic oxide film to calculate the average value of the six lines in total. This surface roughness was measured in 5 visual fields, and the average value was calculated as the arithmetical mean roughness Ra and the mean length of roughness curve elements RSm. A value obtained by dividing the calculated arithmetical mean roughness Ra by the mean length of roughness curve elements RSm was calculated as the sharpness of the roughness curve Ra/RSm.

TABLE 3

| | Structure of anodic oxide film | | | Appearance characteristics | | |
|---|---|---|---|---|---|---|
| | Arithmetical mean roughness Ra (μm) | Mean length of roughness curve elements RSm (μm) | Sharpness of roughness curve Ra/RSm | Unevenness in white color | Hunter whiteness | Determination |
| Example 1 | 0.5 | 8.0 | 0.06 | Good | 63 | Good |
| Example 2 | 10.0 | 5.0 | 2.0 | Good | 68 | Good |
| Example 3 | 2.0 | 6.0 | 0.3 | Good | 83 | Excellent |
| Example 4 | 2.0 | 5.0 | 0.4 | Good | 84 | Excellent |
| Example 5 | 2.0 | 5.0 | 0.4 | Good | 85 | Excellent |
| Example 6 | 2.0 | 5.0 | 0.4 | Good | 84 | Excellent |
| Example 7 | 2.0 | 4.0 | 0.5 | Good | 81 | Excellent |
| Example 8 | 4.0 | 5.0 | 0.8 | Good | 70 | Excellent |
| Example 9 | 2.0 | 5.0 | 0.4 | Good | 75 | Excellent |
| Example 10 | 2.0 | 5.0 | 0.4 | Good | 77 | Excellent |
| Example 11 | 5.0 | 5.0 | 1.0 | Good | 83 | Excellent |
| Example 12 | 2.0 | 3.0 | 0.7 | Good | 72 | Excellent |
| Example 13 | 2.0 | 6.0 | 0.3 | Good | 74 | Excellent |
| Example 14 | 2.0 | 7.0 | 0.3 | Good | 76 | Excellent |
| Example 15 | 2.0 | 10.0 | 0.2 | Good | 80 | Excellent |
| Example 16 | 2.0 | 3.0 | 0.7 | Good | 70 | Excellent |
| Example 17 | 2.0 | 5.0 | 0.4 | Good | 87 | Excellent |
| Example 18 | 2.0 | 6.0 | 0.3 | Good | 90 | Excellent |
| Example 19 | 0.3 | 2.0 | 0.2 | Good | 85 | Excellent |
| Example 20 | 12.0 | 10.0 | 1.2 | Good | 85 | Excellent |
| Example 21 | 0.1 | 1.0 | 0.1 | Good | 85 | Excellent |
| Example 22 | 2.0 | 5.0 | 0.4 | Good | 83 | Excellent |
| Example 23 | 2.0 | 5.0 | 0.4 | Good | 84 | Excellent |
| Example 24 | 0.3 | 5.0 | 0.1 | Good | 70 | Excellent |
| Example 25 | 1.0 | 5.0 | 0.2 | Good | 80 | Excellent |
| Example 26 | 6.0 | 5.0 | 1.2 | Good | 90 | Excellent |
| Example 27 | 2.0 | 5.0 | 0.4 | Good | 80 | Excellent |
| Example 28 | 2.0 | 5.0 | 0.4 | Good | 80 | Excellent |
| Example 29 | 2.0 | 5.0 | 0.4 | Good | 82 | Excellent |
| Example 30 | 2.0 | 5.0 | 0.4 | Good | 82 | Excellent |
| Example 31 | 2.0 | 5.0 | 0.4 | Good | 81 | Excellent |
| Example 32 | 2.0 | 5.0 | 0.4 | Good | 81 | Excellent |
| Example 33 | 2.0 | 5.0 | 0.4 | Good | 85 | Excellent |
| Example 34 | 2.0 | 5.0 | 0.4 | Good | 85 | Excellent |

TABLE 4

| | Structure of anodic oxide film | | | Appearance characteristics | | |
|---|---|---|---|---|---|---|
| | Arithmetical mean roughness Ra (μm) | Mean length of roughness curve elements RSm (μm) | Sharpness of roughness curve Ra/RSm | Unevenness in white color | Hunter whiteness | Determination |
| Comparative Example 1 | 0.1 | 10.0 | 0.01 | Poor | 59 | Poor |
| Comparative Example 2 | 0.05 | 9.0 | 0.006 | Poor | 58 | Poor |
| Comparative Example 3 | 0.07 | 4.0 | 0.02 | Good | 57 | Poor |

TABLE 4-continued

| | Structure of anodic oxide film | | | Appearance characteristics | | |
|---|---|---|---|---|---|---|
| | Arithmetical mean roughness Ra (μm) | Mean length of roughness curve elements RSm (μm) | Sharpness of roughness curve Ra/RSm | Unevenness in white color | Hunter whiteness | Determination |
| Comparative Example 4 | 1.0 | 12.0 | 0.08 | Poor | 59 | Poor |
| Comparative Example 5 | 0.05 | 12.0 | 0.004 | Poor | 53 | Poor |
| Comparative Example 6 | 0.05 | 0.5 | 0.10 | Good | 59 | Poor |
| Comparative Example 7 | 5.0 | 13.0 | 0.38 | Poor | 66 | Poor |

Figure 2:
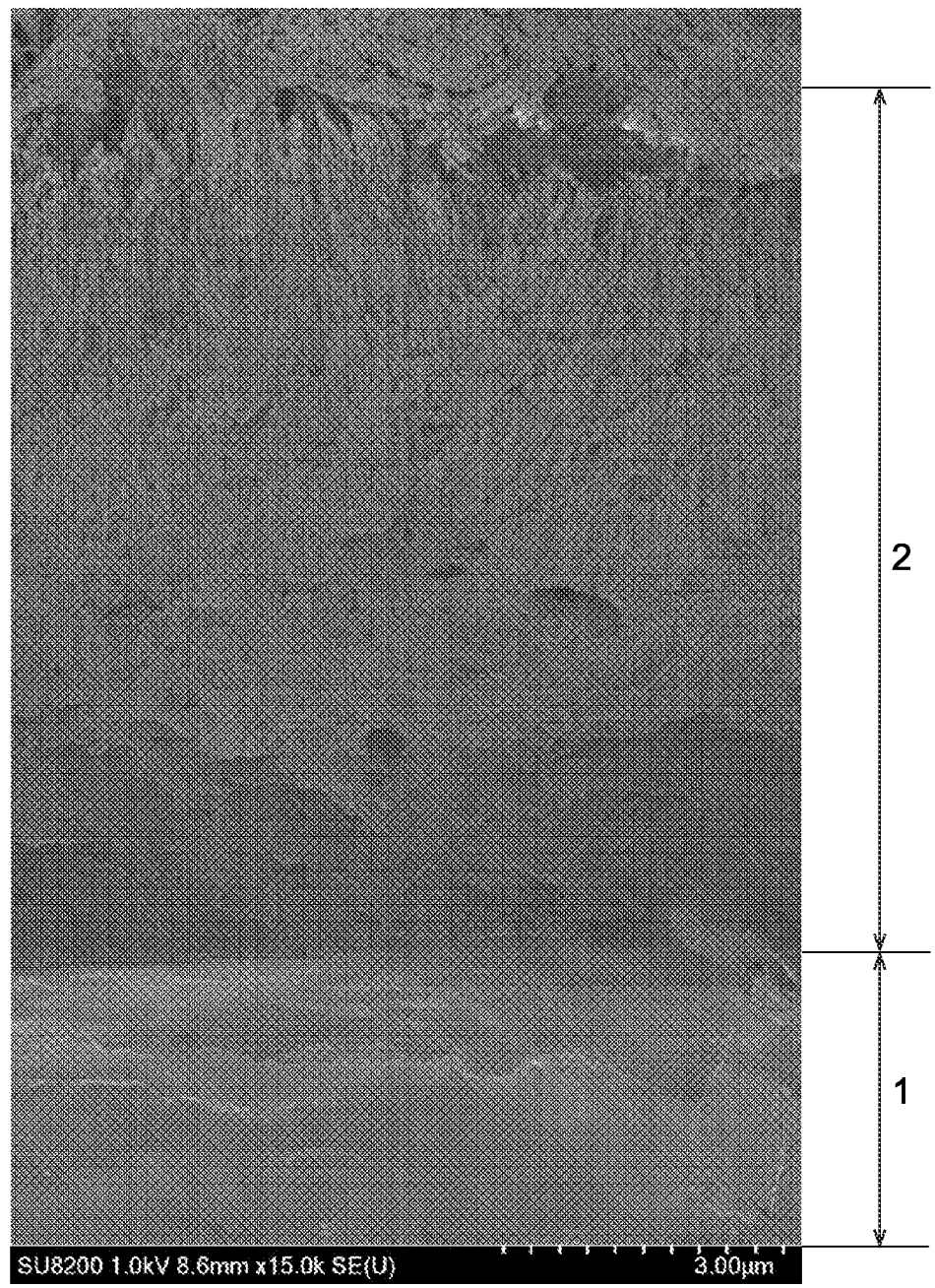
FIG. 2 is an image of a section of an anodic oxide film of an aluminum member obtained in Example 3, the image taken with a scanning electron microscope (SEM).

FIG. 2 shows an image of the section of the anodic oxide film which the section of the aluminum member manufactured in Example 3 had, the image taken with a scanning electron microscope (SEM). As shown in FIG. 2, it can be seen that the anodic oxide film 2 was formed on the mother material 1 in the aluminum member of Example 3.

As shown in Tables 1 and 3, it was ascertained that the anodic oxide film was formed on the surface of the mother material in the aluminum members of Examples 1 to 34 obtained by performing the anodic oxidation treatments on the mother materials containing an aluminum alloy in the electrolytic solutions containing both of the predetermined first acid or a salt of the first acid and the predetermined second acid. Further, in the aluminum members of Examples 1 to 34, the arithmetical mean roughness Ra was 0.1 μm or more, the mean length of roughness curve elements RSm was 10 μm or less, the Hunter whiteness was 60 to 90, and all of the evaluations of the unevenness in white color were "good." Therefore, in Examples 1 to 34, the aluminum members excellent in appearance characteristics could be obtained because the aluminum members exhibited high whiteness, and the occurrence of the unevenness in white is suppressed. Particularly in Examples 3 to 34, the aluminum members having higher whiteness could be obtained because the aluminum members exhibited a high Hunter whiteness of 70 or more.

On the other hand, in Comparative Example 1, alkaline degreasing was only performed as a substrate treatment on the mother material using 5% by mass of NaOH, and an anodic oxidation treatment was not performed. Therefore, the mother material was not anodically oxidized, and thus the anodic oxide film was not formed, and the Hunter whiteness of the obtained aluminum member was low.

In Comparative Example 2, the concentration of a material corresponding to the first acid or a salt of the first acid was too low in the electrolytic solution, and therefore the anodic oxidation treatment on the mother material could not be performed uniformly over the whole treatment area. Further, a material corresponding to the second acid was not contained in the electrolytic solution, and therefore the arithmetical mean roughness Ra was made small, and the light could not be scattered sufficiently. Therefore, the unevenness in white color occurred, and the Hunter whiteness was low in the obtained aluminum member.

In Comparative Example 3, the concentration of a material corresponding to the second acid was too low in the electrolytic solution, and therefore the arithmetical mean roughness Ra was small, and the light could not be scattered sufficiently. Therefore, the anodic oxidation was performed uniformly, but the Hunter whiteness was low in the obtained aluminum member.

In Comparative Example 4, a material corresponding to the first acid or a salt of the first acid was contained excessively in the electrolytic solution, and therefore the solution viscosity increased, and the anodic oxidation treatment on the mother material could not be performed over the whole treatment area. Further, the dissolution power of the electrolytic solution was enhanced to make the current density excessive for growing the anodic oxidation film, and therefore the mean length of roughness curve elements RSm was made large, and the light could not be scattered sufficiently. Therefore, the unevenness in white color occurred, and the Hunter whiteness was low in the obtained aluminum member.

In Comparative Example 5, a material corresponding to the first acid or a salt of the first acid was contained excessively in the electrolytic solution, and therefore the solution viscosity increased, and the anodic oxidation treatment on the mother material could not be performed uniformly over the whole treatment area. Further, the dissolution power of the electrolytic solution was enhanced to make the current density excessive for growing the anodic oxide film, and therefore the mean length of roughness curve elements RSm was made large. Besides, a material corresponding to the second acid was not contained in the electrolytic solution, and therefore the arithmetical mean roughness Ra was made small, and the light could not be scattered more sufficiently than in Comparative Example 4. Therefore, the unevenness in white color occurred, and the Hunter whiteness was lower in the obtained aluminum member.

In Comparative Example 6, Ra/RSm satisfied the predetermined range, but a material corresponding to the second acid was not contained in the electrolytic solution, and therefore the arithmetical mean roughness Ra was made small, and the light could not be scattered sufficiently. Therefore, the anodic oxidation was performed uniformly, but high Hunter whiteness cannot be obtained in the obtained aluminum member.

In Comparative Example 7, a material corresponding to the first acid or a salt of the first acid was contained excessively in the electrolytic solution, and therefore the solution viscosity increased, and the anodic oxidation treatment on the mother material could not be performed uniformly over the whole treatment area. Further, the dissolution power of the electrolytic solution was enhanced to make the current density excessive for growing the anodic oxide film, and therefore the mean length of roughness curve elements RSm was made large, but Ra/RSm was in the predetermined range. Therefore, the light with which the anodic oxide film was irradiated could efficiently be scattered, and the Hunter whiteness was improved. As a result, high Hunter whiteness was obtained, but the unevenness in white color occurred in the obtained aluminum member.

What is claimed is:

1. An aluminum member consisting of:
   a mother material containing aluminum or an aluminum alloy; and
   an anodic oxide film on a surface of the mother material, wherein a thickness of the anodic oxide film is 6 to 100 µm, wherein
   an arithmetical mean roughness Ra, a mean length of roughness curve elements RSm, and a Hunter whiteness of the aluminum member, measured from a surface side of the anodic oxide film, are 0.1 µm or more, 10 µm or less, and 60 to 90, respectively, wherein the surface side of the anodic oxide film is opposite a side of the anodic oxide film on the surface of the mother material.

2. The aluminum member according to claim 1, wherein a relational expression between the arithmetical mean roughness Ra and the mean length of roughness curve elements RSm satisfies $0.1 \leq Ra/RSm \leq 1.2$, and the Hunter whiteness of the aluminum member, measured from the surface side of the anodic oxide film, is 70 to 90.

* * * * *